(12) United States Patent
Cannata

(10) Patent No.: US 12,451,658 B2
(45) Date of Patent: Oct. 21, 2025

(54) EXTENDABLE AND RETRACTABLE WALL OUTLET

(71) Applicant: Jake Cannata, Osage Beach, MO (US)

(72) Inventor: Jake Cannata, Osage Beach, MO (US)

( * ) Notice: Subject to any disclaimer, the term of this patent is extended or adjusted under 35 U.S.C. 154(b) by 305 days.

(21) Appl. No.: 18/335,647

(22) Filed: Jun. 15, 2023

(65) Prior Publication Data

US 2024/0421544 A1    Dec. 19, 2024

(51) Int. Cl.
| | | |
|---|---|---|
| *H01R 13/72* | (2006.01) | |
| *H01R 25/00* | (2006.01) | |
| *H01R 103/00* | (2006.01) | |
| *H02G 11/02* | (2006.01) | |

(52) U.S. Cl.
CPC ............ *H01R 13/72* (2013.01); *H01R 25/006* (2013.01); *H01R 2103/00* (2013.01); *H02G 11/02* (2013.01)

(58) Field of Classification Search
CPC .. H01R 13/72; H01R 25/006; H01R 2103/00; H02G 11/02
See application file for complete search history.

(56) References Cited

U.S. PATENT DOCUMENTS

| | | | | |
|---|---|---|---|---|
| 6,087,587 A | * | 7/2000 | Gonzalez | H02G 11/02 |
| | | | | 220/3.7 |
| 6,648,677 B1 | * | 11/2003 | Boyd | H01R 13/72 |
| | | | | 439/501 |
| 9,935,440 B1 | * | 4/2018 | Szeto | H02J 7/00 |
| 10,700,482 B1 | * | 6/2020 | Vela | H01R 13/665 |

* cited by examiner

*Primary Examiner* — Briggitte R. Hammond
(74) *Attorney, Agent, or Firm* — Bishop & Diehl, Ltd.

(57) ABSTRACT

An extendible wall outlet system is disclosed. The system includes an outlet box, an extension box attached to the outlet box and having a passage between the two boxes, a flexible electrical cord having an extendible receptacle on a free first end and electrically coupled to a power source at an opposing second end, and a spooling device positioned within the extension box and configured for retaining the flexible cord in a coiled manner. The extendible receptacle is retained in a position in the outlet box, is extendible from the outlet box when pulled outward from the outlet box, and the flexible electrical cord uncoils from the spooling device as the receptacle is pulled.

14 Claims, 6 Drawing Sheets

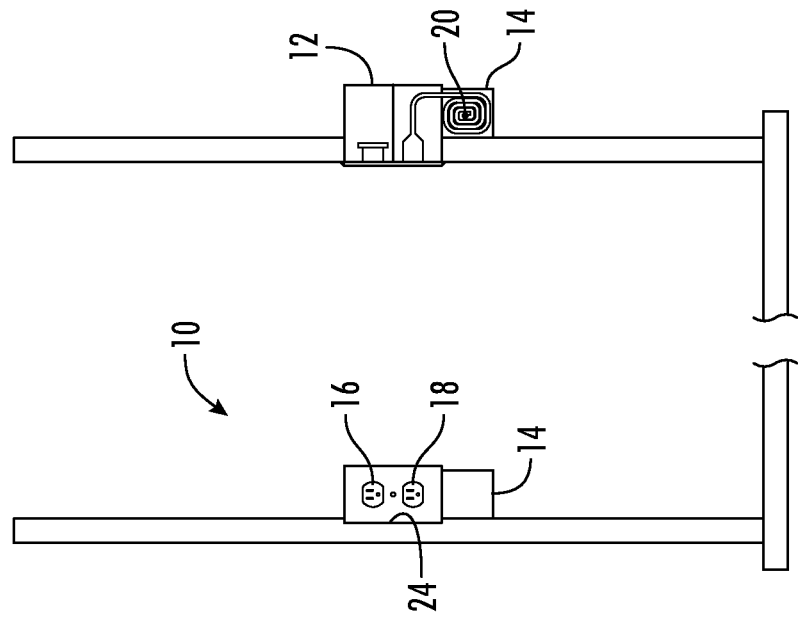
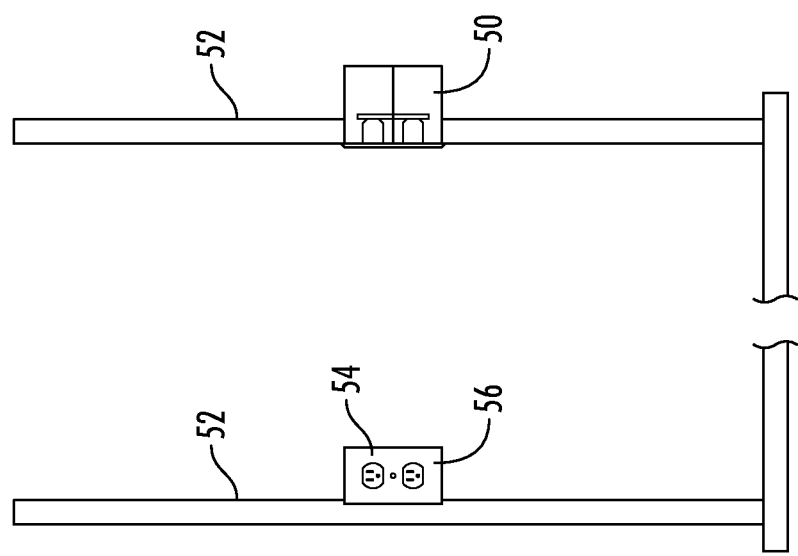

EXTENDABLE AND RETRACTABLE WALL OUTLET

TECHNICAL FIELD OF THE INVENTION

The present invention relates to commercial and household electric outlets. More specifically, the invention relates to an extendable outlet system which can be used to replace existing stationary outlets.

BACKGROUND OF THE INVENTION

It is not uncommon in many commercial and residential spaces to see extension cords and power strips lining floors to provide connections for electric devices not positioned near a power outlet. Similarly, kitchen counters pose another problem when having extension cords permanently crisscrossing a food surface is undesirable. In many instances, the extension cord might not be needed for very long—e.g., during vacuuming, phone charging, using a countertop appliance (e.g., mixer, blender)—which sends a person in need looking for an extension cord. Workshops, garages, outdoor patios, bedrooms, to name a few other areas where extension cords are often needed.

Another problem with the extension cord is that you often have to use a cord which is longer than what you need. For example, a four foot cord would be used for anything requiring 3.5 ft of extension or less; a six foot cord would cover extensions from 3.5 ft to 5.5 ft.; etc., etc. The problems of this reality are at least two-fold: (1) use of typical extension cords often results in an excess of electric cord to get twisted, knotted, tangled, and just look unsightly, and (2) the expense of having several different lengths of extension cords available at all times for a household is significant.

Still, a further issue arises when a stationary outlet is blocked by a piece of furniture leaving little room to access the outlet. Getting to the outlet may require moving the heavy furniture or struggling to get a plug end into and out of a very narrow space. While some plugs have "low-profile" mounting, it may still be problematic to get enough spacing to insert plug prongs.

Until the invention of the present application, these and other problems in the prior art went either unnoticed or unsolved by those skilled in the art. The present invention provides an extendible and retractable wall outlet system which addresses these problems without sacrificing design, style, or affordability.

SUMMARY OF THE INVENTION

There is disclosed herein an extendible wall outlet system which avoids the disadvantages of prior devices while affording additional structural and operating advantages.

Generally speaking, the extendible wall outlet system comprises an outlet box, an extension box attached to the outlet box and having a passage between the two boxes, a flexible electrical cord having an extendible receptacle on a free first end and electrically coupled to a power source at an opposing second end, and a spooling device positioned within the extension box and configured for retaining the flexible cord in a coiled manner. The extendible receptacle is retained in a position in the outlet box, is extendible from the outlet box when pulled outward from the outlet box, and the flexible electrical cord uncoils from the spooling device as the receptacle is pulled.

In specific embodiments, the spooling device comprises an automatic stop/lock mechanism to engage and hold the flexible electrical cord at a position when uncoiled. Further, the spooling device comprises an automatic rewind mechanism to rewind the flexible electrical cord when the stop/lock mechanism is not engaged.

In specific embodiments, the extendible wall outlet system is configured to be placed behind and be accessible within a wall, either as original equipment at construction or as a retrofit system to replace an existing outlet. Likewise, the extendible wall outlet system may be configured to be placed behind and be accessible within a surface, such as a workbench, furniture, table, and the like.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

FIG. 1A is a front view of a standard (prior art) wall outlet installed against a wall stud;

FIG. 1B is a side view of the wall outlet installation of FIG. 1A;

FIG. 2A is a front view of an embodiment of the wall outlet of the disclosed system installed against a wall stud;

FIG. 2B is a side view of the wall outlet installation of FIG. 2A;

DETAILED DESCRIPTION OF THE INVENTION

Figure 3:
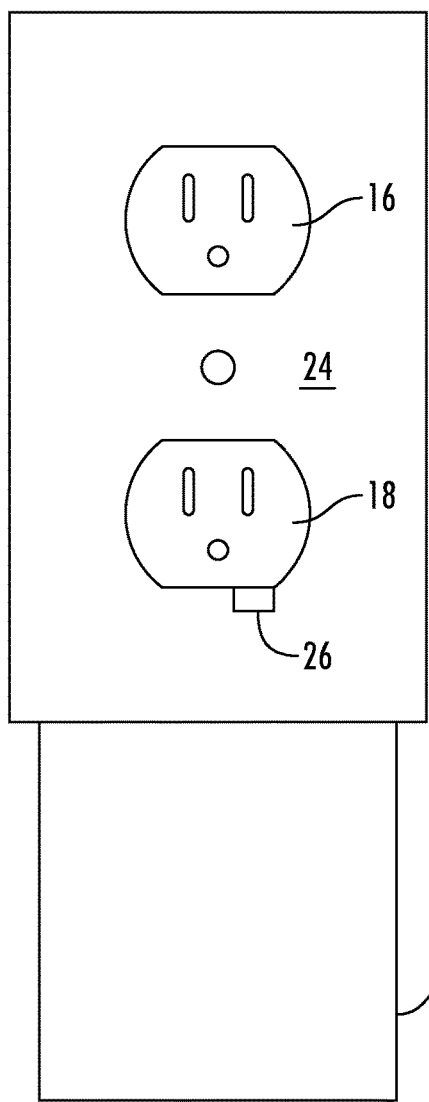
FIG. 3 is a front view of the embodiment of the wall outlet of FIG. 2A.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIG. 1, a common wall-recessed outlet box 50 of the prior art is shown. The box 50 is typically secured to a wall stud 52 and installed with an outlet 54, which is then hardwired to a power source. The outlet 54 is installed to face outward from the opening to allow plug access to the usual 2-4 ports, and it is usually finished with a decorative outlet plate 56. In addition to the typical two to four 3-prong plug port outlets on the market, alternate outlets may include a single 3-prong plug port and at least one of either USB and/or Type-C cable connector ports.

Referring now to FIGS. 2-10, there is illustrated an extendable outlet system, generally designated by the numeral 10. The particular illustrated outlet system 10 is for a placement in a wall. However, while all the embodiments illustrated are directed to a wall-recessed system 10, it should be understood that the principles of the invention can be more broadly applied to almost any surface where an outlet might be positioned, including exterior walls, ceilings, and floors, as well as furniture such as work benches, nightstands, desks, and the like.

Specifically, as can be seen in FIGS. 2-5, the illustrated embodiment of the outlet system 10 is comprised of an outlet box 12, an extension box 14, a fixed outlet 16 (optional), an extendible outlet/receptacle 18 (preferably 3-prong) with a length of flexible cord 20, a spooling device 22, and an outlet plate 24. Both the fixed outlet 16 and the extendible outlet 18 are connected to an electric power source, via a power cable 36, in a manner similar to a standard outlet. The system 10 can be installed during construction or it can be marketed, sold, and installed as a retrofitted system.

The extension box 14 is positioned adjacent a top or bottom side of the outlet box 12. An opening 30 between the two boxes, 12 and 14, allows passage of the flexible cord 20. It is important that the opening 30 be free of sharp edges and metal burrs which could cut or snag the flexible cord 20. At one end of the flexible cord 20 is attached the extendible outlet/receptacle 18 and the other end is fixed to the spooling device 22. The excess flexible cord 20 is coiled about the spooling device 22. The flexible cord 20 can be various lengths and wire gauges, depending on the intended use as is well-known in the art. Preferably, a 10-foot length of a 12 or 14 gauge wire is effective for most common household appliances and uses. As previously noted, the extendible outlet 18 and flexible cord 20 are connected to an electric power source in a manner similar to the fixed outlet 16 of the outlet box 12.

The extension box 14 is preferably fireproof to help prevent electrical fires beginning within the box 14 from the coiled cord 20 should it become frayed or damaged in any way. The spooling device 22 preferably includes an automatic "recoil" feature as well as an automatic "stop/lock" feature when being uncoiled. That is, the flexible electrical cord 20 can be unspooled by pulling with a sufficient force on the free end. Once the pulling force is terminated, the "stop/lock" feature prevents the cord 20 from rewinding. However, a short pull on the cord 20 triggers the automatic "recoil" of the spooling device 22 to pull the cord 20 back into a wound or coiled condition. Alternatively, the spooling device 22 may have a manual "stop/lock" feature—much like a retractable measuring tape—which when unlocked causes any extended flexible cord 20 to be recoiled.

Figure 4:
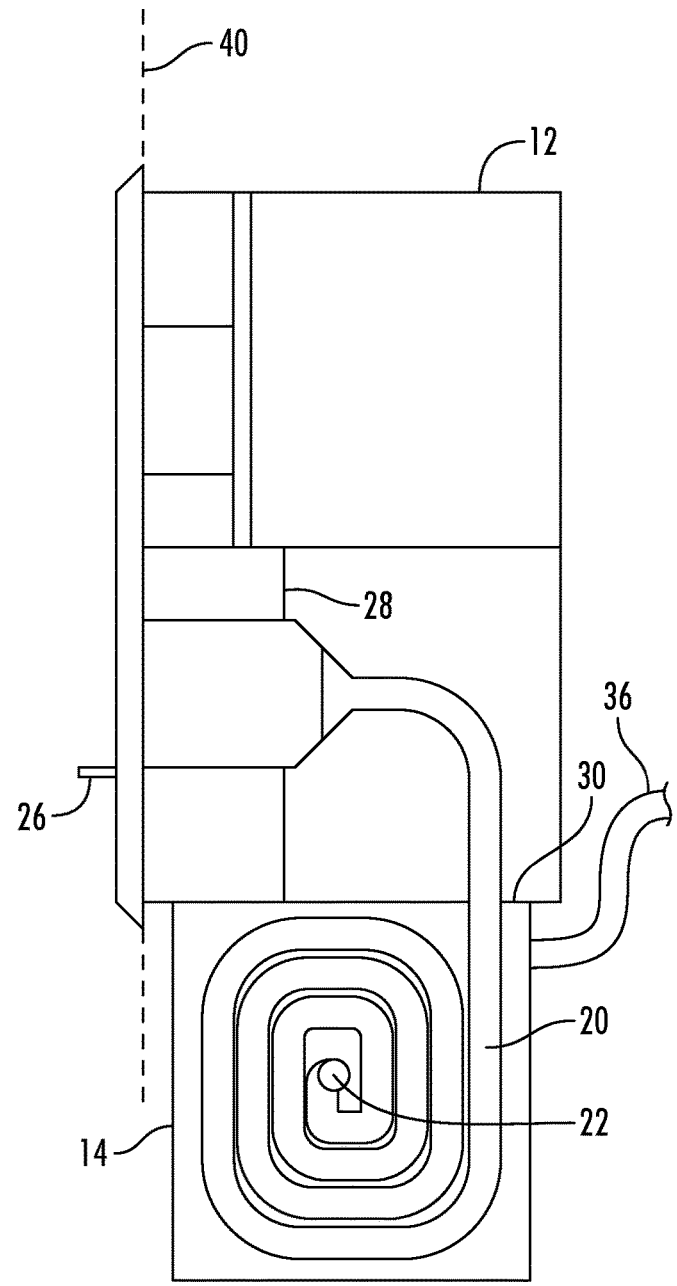
FIG. 4 is a side view of the embodiment of the wall outlet of FIG. 2A with a side panel removed on the extension box.

As shown in FIGS. 3 and 4, the extension box 14 sits below (or above) the outlet box 12 and behind the surface 40 in which the system 10 is installed (e.g., drywall). The extension box 14 is preferably fireproof to provide insulation for the surface 40. The system 10 may be installed during construction (i.e., original equipment) or retrofitted to replace an existing outlet. The extendible outlet 18 should be configured such that it is held approximately flush to the outlet plate 24 when retracted, as shown in FIG. 4, and resists being pushed inward when used as a standard outlet. This may be achieved in a number of ways, including a tab 26 on the extendible outlet 18 which allows a user to pull to extend the flexible cord 20. The tab 26 would need to be positioned where it does not interfere with access to the outlet 18. Further, a back panel 28 may be used to "seat" the extendible outlet 18 when in the retracted position and also prevent the outlet 18 from being pushed through the outlet plate 24. Alternate methods and modifications exist and would be understood by those of skill in the art to be encompassed by the general purpose and description herein. Such alternative methods and modifications may be more suitable for specific applications of the disclosed system— e.g., workbench outlet, kitchen counter outlet, and exterior outlet.

Figure 5:
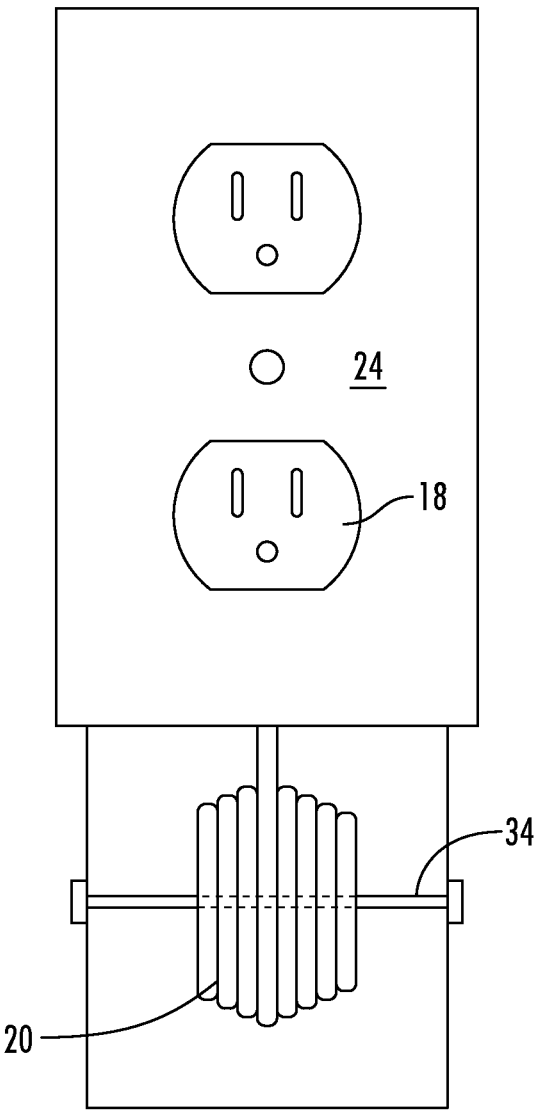
FIG. 5 is another front view of the embodiment of the wall outlet of FIG. 2A with a front panel removed on the extension box.

FIG. 5 illustrates horizontal spooling of the flexible cord 20 onto a central axis 34 within extension box 14. Alternatively, the spooling may be vertical (not shown) for specific applications with less space below/above the outlet 18.

Figure 6:
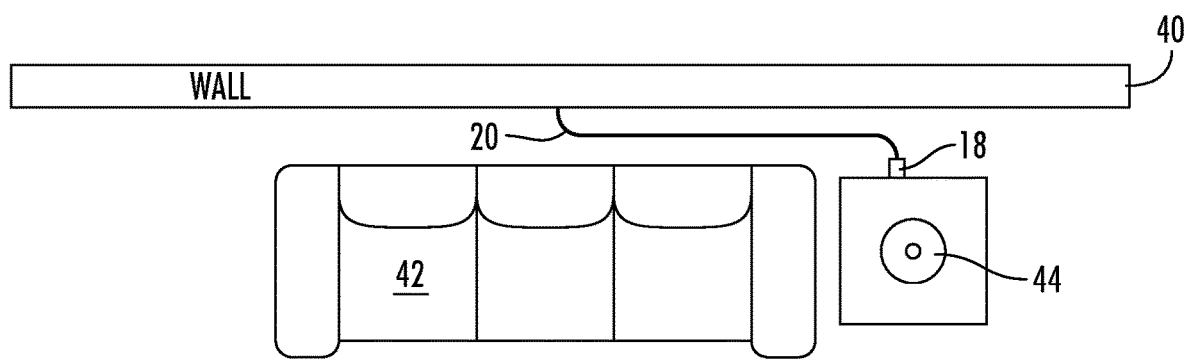
FIG. 6 is a top view of a space showing an embodiment of the disclosed system in use.

FIG. 6 illustrates just one of a myriad of uses for the disclosed system 10. As shown, the extendible outlet 18 is extended, via the flexible cord 20, from a wall outlet positioned behind a sofa 42 to a table lamp 44.

Figure 7:
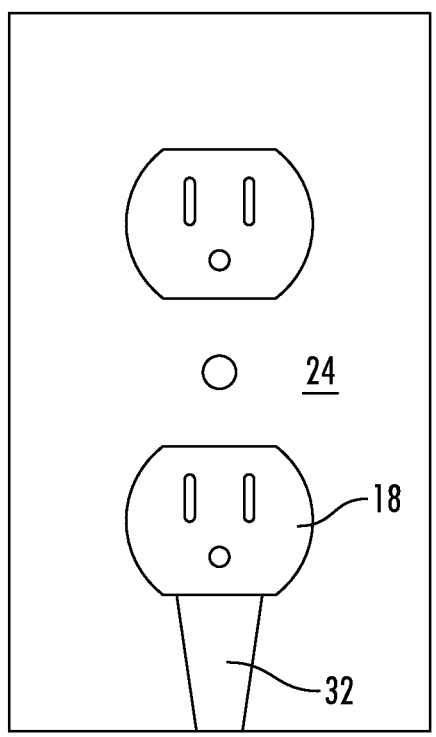
FIG. 7 is a front view of an embodiment of an outlet plate used in the disclosed system.
Figure 8:
FIG. 8 is a side view of the outlet plate of FIG. 7.

Referring to FIGS. 7 and 8, an alternate feature is illustrated. A cord groove 32 in the outlet cover 24 provides a smooth surface and a less severe angle for extension and retraction of the flexible cord 20. The groove 32 also allows the flexible cord 20 to lay substantially parallel to the surface of the outlet cover 24 in the case where the outlet is blocked, for example by furniture or the like.

Figure 9:
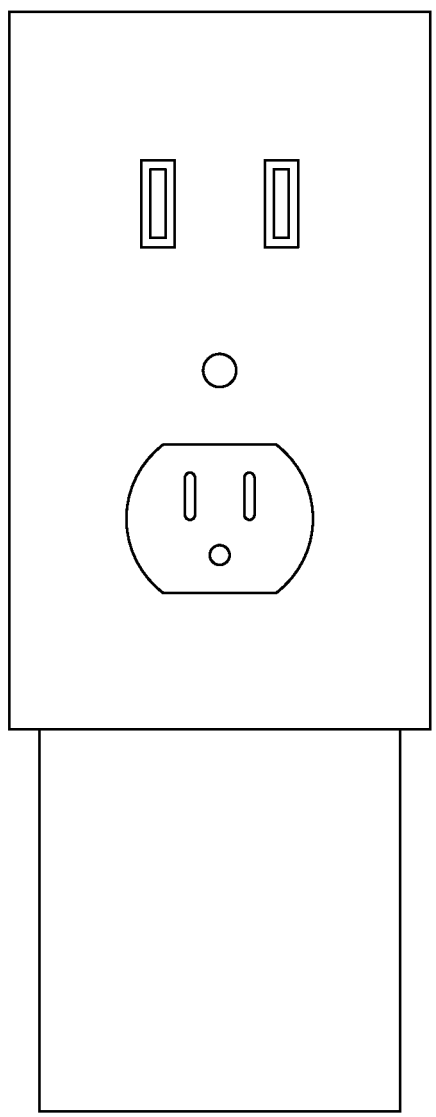
FIG. 9 is a front view of another embodiment of the disclosed outlet system.
Figure 10:
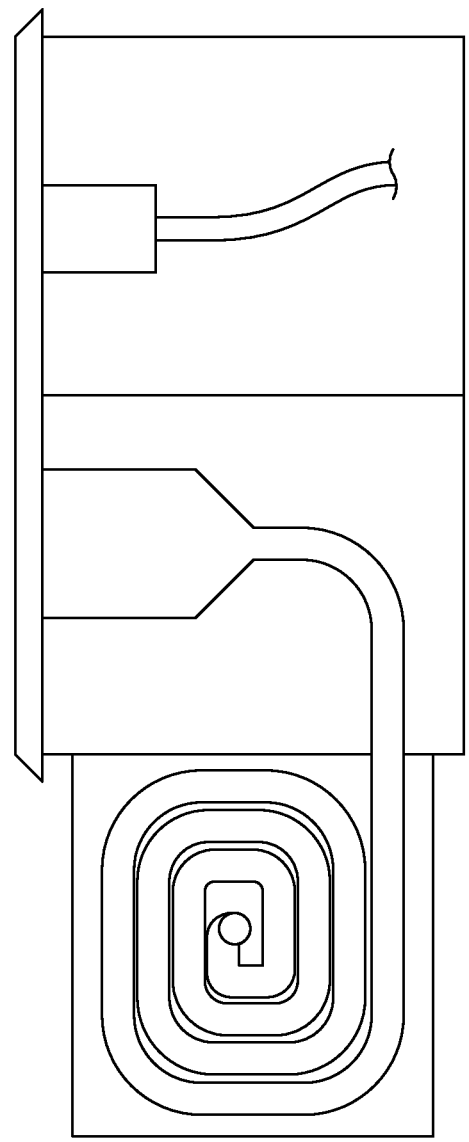
FIG. 10 is a side view of the embodiment of FIG. 9 with a side panel removed from the extension box.

Finally, with reference to FIGS. 9 and 10, alternate embodiments can be more readily understood. As illustrated, the stationary outlet may be replaced with a single or double USB charging port 3. The stationary outlet may even be replaced with a second extendible outlet (not shown) with an extension box (not shown) on the opposite side from the first extendible outlet 18. Variations and alterations may be made without deviating from the broader concept of the disclosed system 10.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An extendible wall outlet system comprising:
   an outlet box;
   an extension box attached to the outlet box and having a passage to the outlet box;
   a flexible electrical cord having an extendible receptacle on a free first end and electrically coupled to a power source at an opposing second end;
   an outlet plate attachable to the outlet box with an opening to allow the extendible receptacle to extend through and a groove extending from the opening; and
   a spooling device positioned within the extension box and configured for retaining the flexible cord in a coiled manner;
   wherein the extendible receptacle on the free first end of the flexible cord is retained in a position in the outlet box, is extendible from the outlet box when pulled outward from the outlet box, and the flexible electrical cord uncoils from the spooling device as the receptacle is pulled.

2. The extendible wall outlet system of claim 1, wherein the spooling device comprises an automatic stop/lock mechanism to engage and hold the flexible electrical cord at a position when uncoiled.

3. The extendible wall outlet system of claim 2, wherein the spooling device further comprises an automatic rewind mechanism to rewind the flexible electrical cord when the stop/lock mechanism is not engaged.

4. The extendible wall outlet system of claim 1, further comprising a fixed receptacle positioned within the outlet box.

5. The extendible wall outlet system of claim 1, further comprising at least one USB port positioned within the outlet box.

6. The extendible wall outlet system of claim 1, further comprising a tab extending from the extendible receptacle, wherein the tab is perpendicular to the outlet plate.

7. The extendible wall outlet system of claim 1, wherein the outlet box comprises a seat for retaining the extendible receptacle in a fixed position within the outlet box.

8. The extendible wall outlet system of claim 1, wherein the system is configured to be accessible from within a wall.

9. The extendible wall outlet system of claim 1, wherein the system is configured to be placed behind and be accessible within a surface.

10. The extendible wall outlet system of claim 1, wherein the system is configured to replace an existing wall outlet.

11. The extendible wall outlet system of claim 1, wherein the spooling device comprises a horizontal axis parallel to the outlet cover.

12. The extendible wall outlet system of claim 1, wherein the spooling device comprises a horizontal axis perpendicular to the outlet cover.

13. The extendible wall outlet system of claim 1, wherein the spooling device comprises a vertical axis.

14. An extendible wall outlet system comprising:

an outlet box;

an extension box attached to the outlet box and having a passage to the outlet box;

a flexible electrical cord having an extendible receptacle on a free first end, the extendible receptacle having an extending tab and being electrically coupled to a power source at an opposing second end;

a spooling device positioned within the extension box and configured for retaining the flexible cord in a coiled manner; and an outlet plate attachable to the outlet box with an opening to allow the extendible receptacle to extend through and a groove extending from the opening;

wherein the extendible receptacle on the free first end of the flexible cord is retained in a fixed position in the outlet box by a seat, is extendible from the outlet box through the opening in the outlet plate when pulled outward from the outlet box, and the flexible electrical cord uncoils from the spooling device as the receptacle is pulled.

* * * * *